United States Patent
Bordini

(10) Patent No.: US 8,131,433 B2
(45) Date of Patent: Mar. 6, 2012

(54) DEVICE FOR LONGITUDINALLY BALANCING AN AGRICULTURAL VEHICLE

(75) Inventor: Giorgio Bordini, Modena (IT)

(73) Assignee: CNH America LLC

( * ) Notice: Subject to any disclaimer, the term of this patent is extended or adjusted under 35 U.S.C. 154(b) by 742 days.

(21) Appl. No.: 12/122,525

(22) Filed: May 16, 2008

(65) Prior Publication Data
US 2009/0043461 A1    Feb. 12, 2009

(51) Int. Cl.
*G06G 7/48*    (2006.01)
*B62D 49/08*    (2006.01)

(52) U.S. Cl. .................. 701/50; 701/124; 280/755

(58) Field of Classification Search ............ 701/38, 701/50, 124; 280/755, 758; 172/611
See application file for complete search history.

(56) References Cited

U.S. PATENT DOCUMENTS

| | | | | |
|---|---|---|---|---|
| 3,265,218 A | * | 8/1966 | Stefanutti | 212/196 |
| 3,608,645 A | * | 9/1971 | Meiners | 172/491 |
| 3,726,416 A | * | 4/1973 | Pottorff et al. | 212/178 |
| 3,734,326 A | | 5/1973 | Esser | |
| 4,322,094 A | | 3/1982 | Bobard | |
| 4,861,069 A | * | 8/1989 | Gunter | 280/758 |
| 5,230,529 A | * | 7/1993 | Harvey-Bailey | 280/5.508 |
| 5,601,145 A | * | 2/1997 | Thompson | 172/4.5 |
| 5,685,563 A | * | 11/1997 | Ottestad | 280/758 |
| 6,341,665 B1 | * | 1/2002 | Zhou et al. | 182/2.8 |

FOREIGN PATENT DOCUMENTS

| | | |
|---|---|---|
| EP | 0383297 | 8/1990 |
| GB | 2160167 | 12/1985 |
| WO | WO8200815 | 3/1982 |

* cited by examiner

*Primary Examiner* — Bret Hayes
(74) *Attorney, Agent, or Firm* — Sue C. Watson; Patrick Sheldrake

(57) ABSTRACT

A method and device for longitudinally balancing an agricultural vehicle, in particular a tractor, whereby at least one sensor, for detecting at least one respective stress affecting a longitudinal attitude of the agricultural vehicle, controls an actuating device of a ballast to move the ballast longitudinally along the agricultural vehicle, which at least partly compensates for the stress.

18 Claims, 4 Drawing Sheets

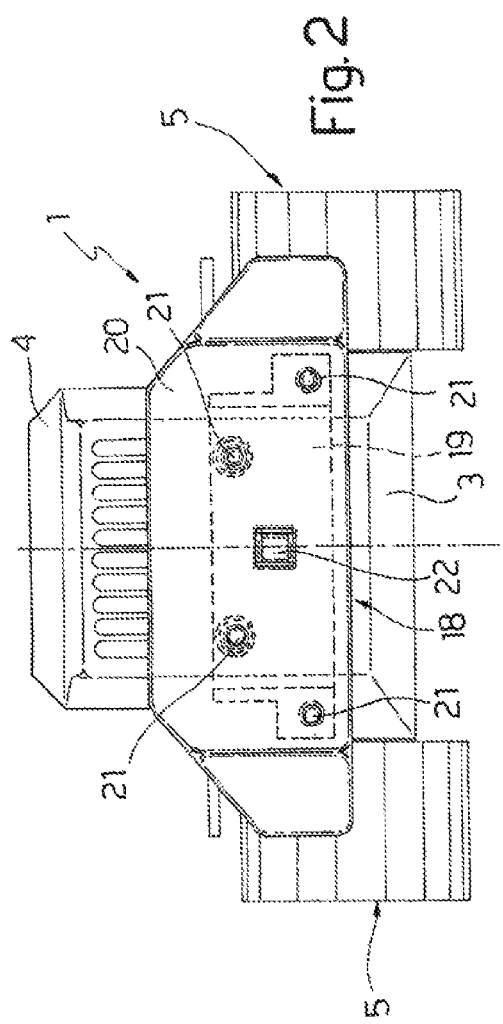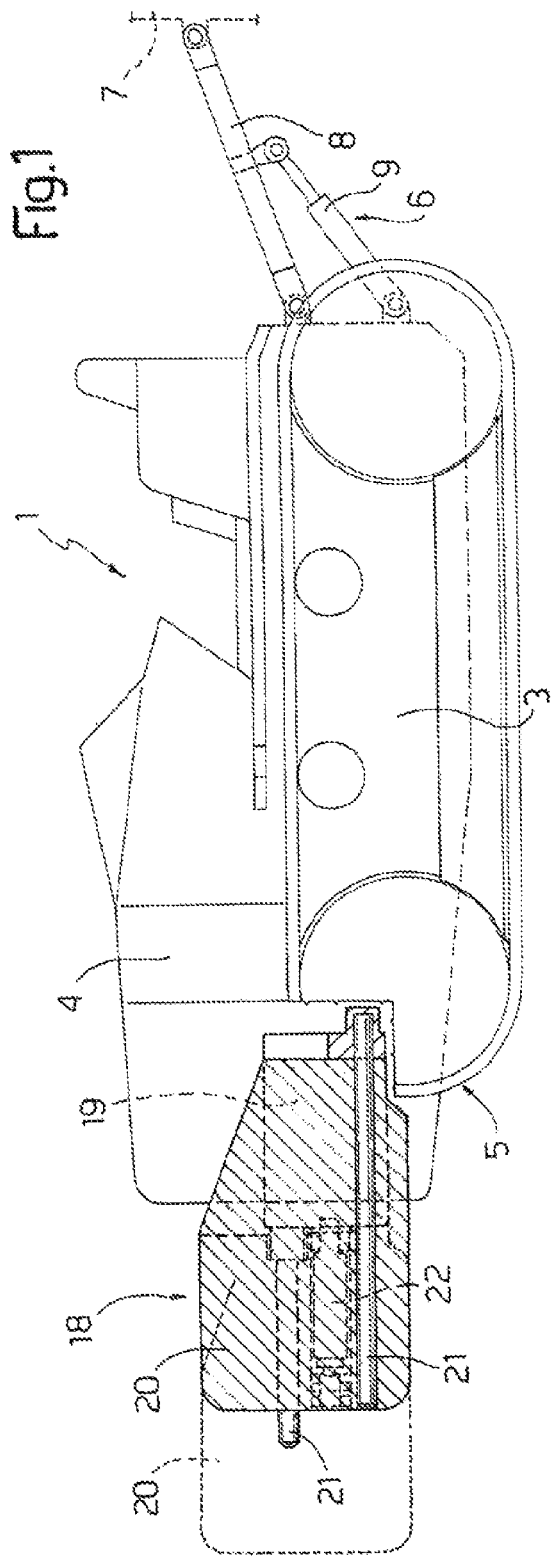

US 8,131,433 B2

DEVICE FOR LONGITUDINALLY BALANCING AN AGRICULTURAL VEHICLE

FIELD OF THE INVENTION

The present invention relates to a method and device for longitudinally balancing an agricultural vehicle, in particular a tractor.

BACKGROUND OF THE INVENTION

As is known, one of the major hazards when operating an agricultural vehicle is the loss of longitudinal stability in the various and, often, difficult conditions in which the vehicle is operated.

Commonly, the longitudinal attitude of an unloaded, stationary agricultural vehicle having a substantially horizontal barycentric longitudinal axis is altered, and may even be compromised. An altered longitudinal attitude often results in the loss of longitudinal stability and tip-up of the vehicle, whenever any static and/or dynamic force is applied having a vertical component and a point of application some distance from a barycentric plane perpendicular to the barycentric longitudinal axis.

For example, the loss of longitudinal stability may occur when a very heavy projecting implement is connected to a lift member of the vehicle. In certain operating conditions the weight of the vehicle alone may not be sufficient to counterbalance the tip-up moment produced when the implement, normally resting on the ground, is lifted off the ground.

The same also applies, whether or not the implement is lifted, when the vehicle is operated over very rough or steep ground.

To safeguard against loss of longitudinal stability caused by a raised implement, agricultural vehicles are equipped with ballast, connected integrally in a fixed position to the end of the vehicle opposite the implement end, to produce a stabilizing moment to counterbalance the tip-up moment produced by lifting the implement.

Because the stabilizing moment produced by the ballast is constant and proportional to the weight of the ballast and its distance from the end of the vehicle, the effectiveness of the above known balancing system is seriously impaired by the obvious reasons of size, and that the ballast must project as little as possible from the end of the vehicle. The ballast must also not be so heavy as to unnecessarily overload the vehicle in normal operating conditions.

OBJECT OF THE INVENTION

It is an object of the present invention to provide an agricultural vehicle balancing method and device which are cheap and easy to implement, and designed to eliminate the aforementioned drawback.

SUMMARY OF THE INVENTION

According to the present invention, there is provided a method of balancing an agricultural vehicle by using a sensor to detect the effects on the agricultural vehicle of stress affecting a given longitudinal attitude of the agricultural vehicle. An actuating device of a ballast that can be moved longitudinally along the agricultural vehicle in response to an output signal of the sensor is then controlled to move the ballast to at least partly compensate the effects. Since the stress can affect the longitudinal inclination of the agricultural vehicle; the sensor could be an inclinometer.

The actuating device is activated in response to a signal emitted by the sensor, if the intensity of the signal is above a given threshold. The ballast is moved longitudinally by the actuating device between a fully withdrawn position and a fully extracted position, proportionately to the intensity of said signal. The actuating device may be a hydraulic actuator supplied with pressurized fluid via a valve controlled by a central control unit connected to the sensor. The sensor is configured to emit signals of an intensity proportional to the effects of the stress.

The stress may comprise a load and a tip-up moment caused by raising an implement being connected to and projecting from the agricultural vehicle, off the ground by a hydraulic lifting arrangement having a hydraulic feed circuit, which may communicate with the hydraulic actuator via a valve. The internal pressure of the hydraulic feed circuit can also be detected by a sensor.

The present invention, also provides for a device for balancing an agricultural vehicle, in particular a tractor, that has at least one ballast movable longitudinally along the agricultural vehicle, a sensor for detecting the stress on a given longitudinal attitude of the agricultural vehicle; and an actuating device connected to the ballast. The actuating devices moves the ballast longitudinally in to at least partly compensate for the stresses in response to a signal from the sensor.

BRIEF DESCRIPTION OF THE DRAWINGS

The invention will now be described further, by way of example, with reference to the accompanying drawings, in which:

FIG. 1 shows a schematic, partly sectioned side view of an agricultural vehicle featuring a preferred embodiment of the balancing device according to the present invention;

FIG. 2 shows a front view of the FIG. 1 vehicle;

DESCRIPTION OF THE PREFERRED EMBODIMENT

Figure 3:
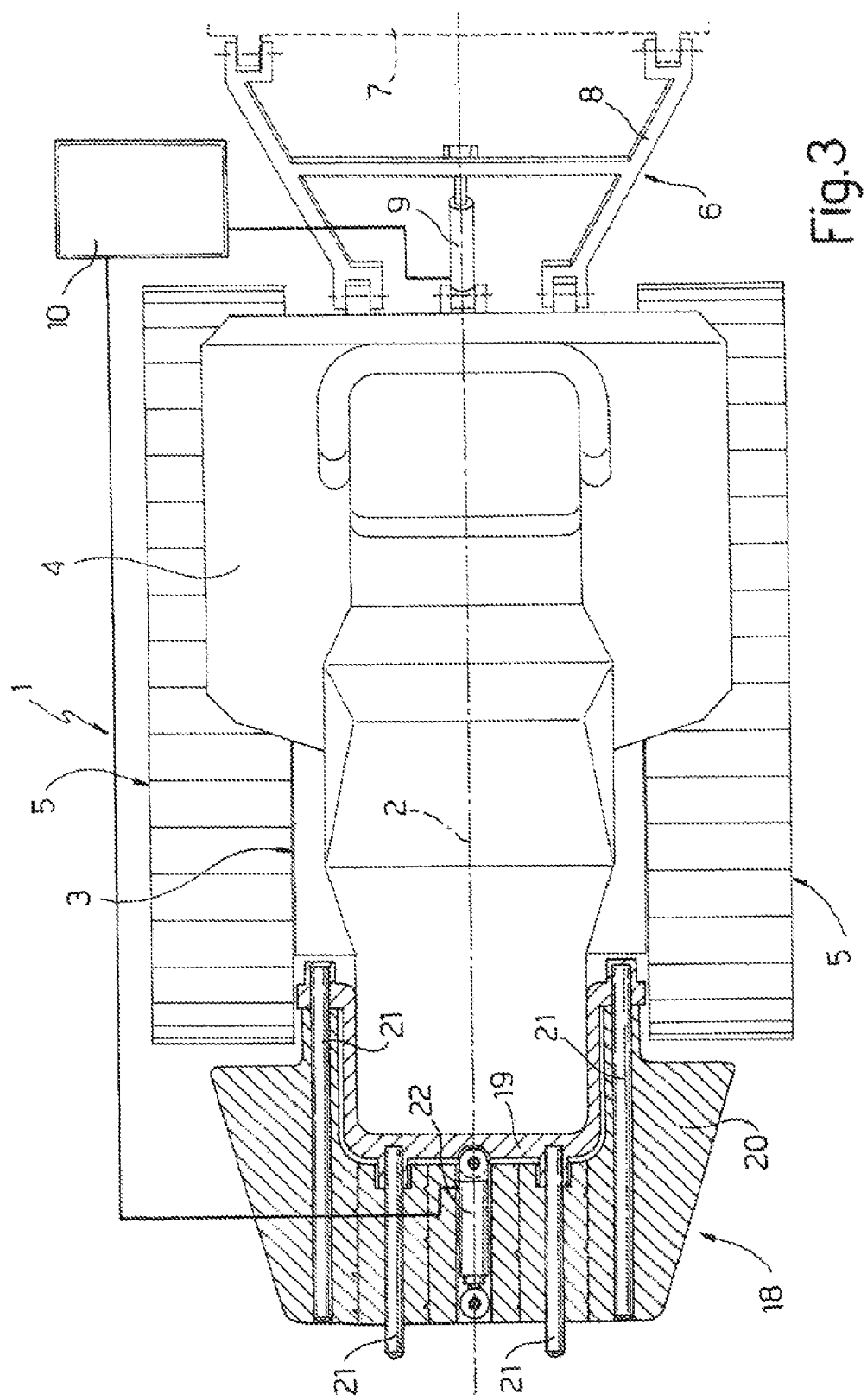
FIGS. 3 and 4 show partly sectioned, partly block plan views of the FIG. 1 vehicle in respective different operating configurations.

FIG. 1 shows a vehicle 1 in particular a crawler tractor, which has a barycentric longitudinal axis 2, and comprises a frame 3, a body 4, and two known crawler traction devices 5 on opposite sides of axis 2.

Vehicle 1 has a known member 6 for attaching and lifting an implement 7 (shown by the dash line) at the rear longitudinal end.

As shown in FIGS. 1 and 3, member 6 comprises a fork 8 hinged to frame 3 and connectable removably to implement 7; and a known hydraulic cylinder 9 connected to a hydraulic circuit 10 of vehicle 1 and interposed between frame 3 and fork 8 to lift and lower fork 8 and implement 7 with respect to the ground in response to control by the operator.

Figure 5:
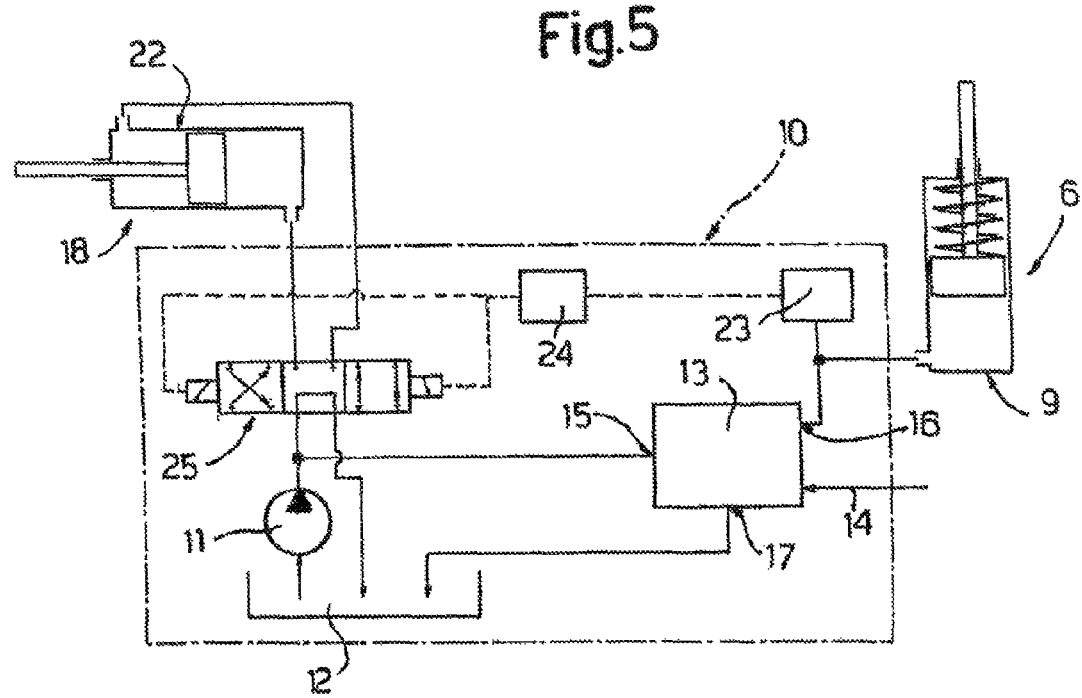
FIGS. 5 and 6 show schematic block diagrams of a first and second preferred embodiment, respectively, of a control circuit of the balancing device according to the present invention.
Figure 6:
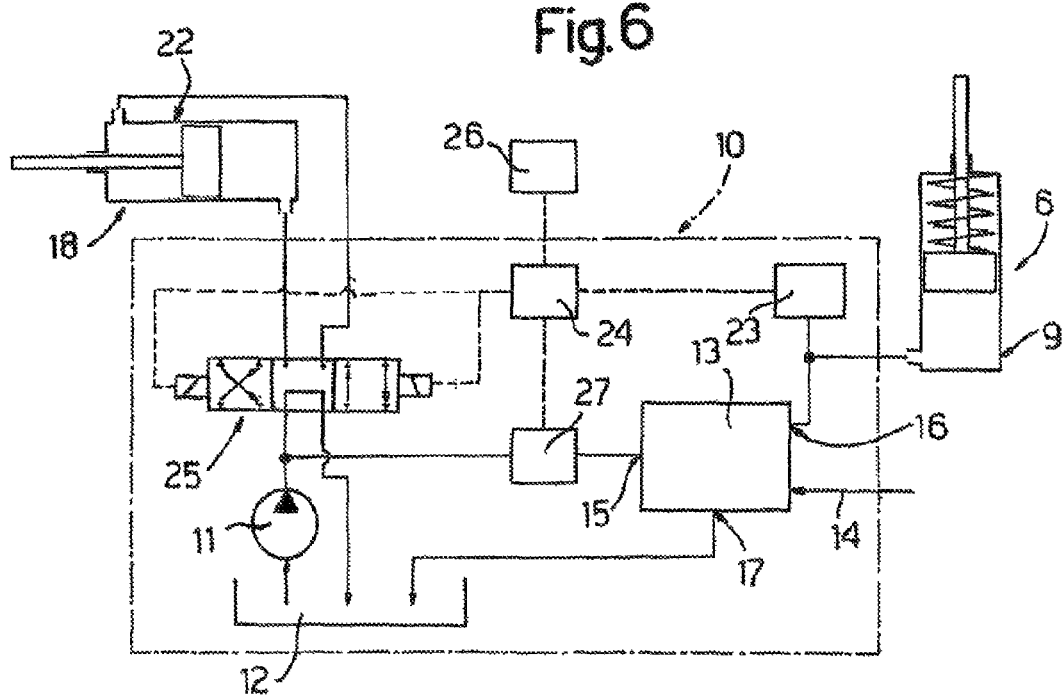

As shown in FIGS. 5 and 6, hydraulic circuit 10 comprises, in known manner, a pump 11 communicating with an oil tank 12 and for feeding oil to hydraulic cylinder 9 via a valve 13, which is activated by the operator by an external control 14. The valve 13 and comprises an inlet 15 connected to the delivery of pump 11, an outlet 16 connected to hydraulic cylinder 9, and a drain 17 communicating with tank 12.

When implement 7 is resting on the ground, inlet 15 and drain 17 of valve 13 are open, and outlet 16 is closed, so that pump 11 is kept running by the engine (not shown) of vehicle 1 and keeps oil circulating, in a known manner, through valve 13 with no effect on hydraulic cylinder 9. When activated by the operator, external control 14 closes drain 17 and opens outlet 16 in a known manner, thus feeding oil to hydraulic cylinder 9, raising implement 7, and exerting a longitudinal tip-up moment on vehicle 1.

As shown in the accompanying drawings, vehicle 1 is fitted with a balancing device 18 which, as explained in detail below, provides for automatically and, preferably, adjustably balancing vehicle 1 upon detection of stress affecting the longitudinal attitude of vehicle 1.

In the example shown, balancing device 18 is used to compensate disturbance stress produced by lifting implement 7 and is conveniently connected to the opposite end of vehicle 1 to that fitted with member 6, i.e. to the front end of vehicle 1 in the example shown. Should member 6, however, be connected to the front end of vehicle 1, as is sometimes the case, balancing device 18 is, obviously, conveniently connected to the rear end of vehicle 1.

In the example shown, balancing device 18 comprises a bracket 19 connected rigidly to the front end of frame 3; and ballast 20 fitted in longitudinally sliding manner to bracket 19 by four guide rods 21, which are integral with bracket 19, parallel to axis 2, and housed in sliding manner inside respective holes in ballast 20.

Figure 4:
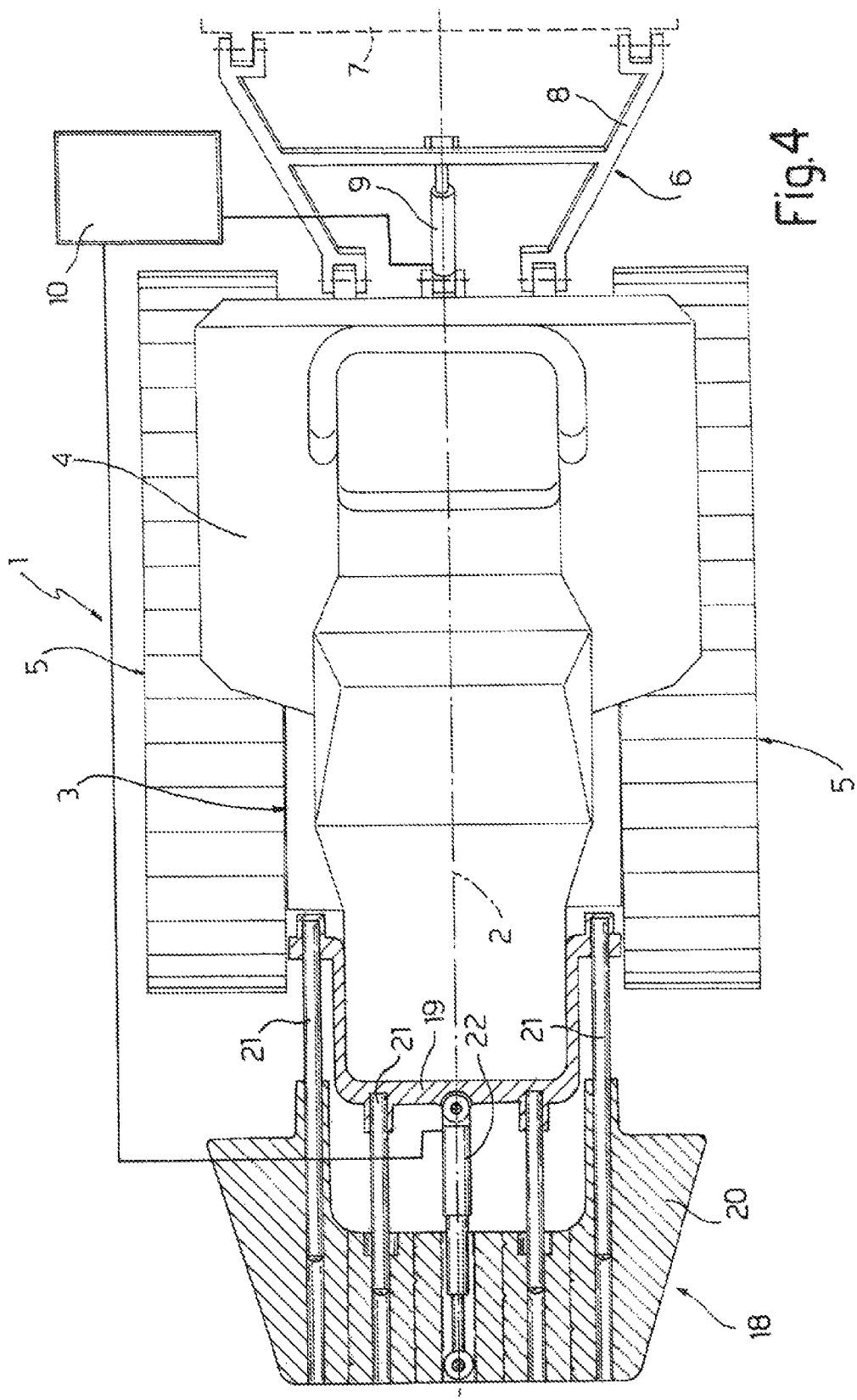

A known double-acting hydraulic actuator 22 is interposed between bracket 19 and ballast 20, is connected to hydraulic circuit 10, and is activated, as explained below, to move ballast 20 longitudinally between a withdrawn position (FIG. 3) and an extracted position (FIG. 4) in response to disturbance stress producing a tip-up moment capable of rotating vehicle 1 about a horizontal axis crosswise to axis 2.

In a variation not shown, hydraulic actuator 22 is a single-acting hydraulic actuator, the piston of which is connected to a return spring.

As shown in FIG. 5, balancing device 18 comprises a sensor 23, which, in the example shown, is a pressure sensor located between output 16 of valve 13 and hydraulic cylinder 9, and which supplies a central control unit 24 with a signal proportional to the pressure inside hydraulic cylinder 9. Central control unit 24 controls a slide valve 25 forming part of hydraulic circuit 10 and located between hydraulic actuator 22 and pump 11.

In actual use, when hydraulic cylinder 9 is activated to lift an implement 7, attached to fork 8, off the ground, sensor 23 detects an increase in oil pressure in hydraulic circuit 10, and transmits a relative signal to central control unit 24. If the value of the signal exceeds a given threshold, the central control unit 24 opens slide valve 25 to feed oil to hydraulic actuator 22 and so move ballast 20 along rods 21 into the extracted position to counterbalance the destabilizing moment produced by lifting implement 7.

In another embodiment shown in FIG. 6, in addition to sensor 23, balancing device 18 also comprises a sensor sensitive to the effects caused by a different type of disturbance. In the example shown, the additional sensor is a longitudinal inclinometer 26 integral with vehicle 1 and sensitive to the longitudinal attitude of vehicle 1.

Like sensor 23, inclinometer 26 transmits a signal to central control unit 24, which, if the signal exceeds a given threshold, opens slide valve 25 to feed oil to hydraulic actuator 22 and so move ballast 20 along rods 21.

Operation of hydraulic actuator 22 in response to a signal from inclinometer 26 is made independent of whether or not a load is attached to fork 8 by a control valve 27 located between pump 11 and valve 13 to control the delivery of pump 11 and produce, in the absence of a load attached to fork 8, a pressure allowing oil supply to hydraulic actuator 22.

In a variation not shown, balancing device 18 comprises, together with or instead of ballast 20, further ballast similar to ballast 20 but located at the rear of vehicle 1 to compensate the effects of external stress having a tendency to tip vehicle 1 longitudinally forwards.

In a further variation not shown, in addition to sensor 23 and inclinometer 26, balancing device 18 may comprise further sensors for determining longitudinal displacement of ballast 20 upon detection of disturbance affecting the stability of vehicle 1.

In connection with the above, it should be pointed out that any stress, of whatever nature, tending to destabilize vehicle 1 longitudinally, undoubtedly affects the inclination of axis 2. Consequently, inclinometer 26 or any sensor system, e.g. a system of load cells, sensitive to variations in load distribution on the axles of vehicle 1, may be more than sufficient, on its own, to control longitudinal displacement of ballast 20.

It should be pointed out that the longitudinal displacement of ballast 20 may be the full travel of the ballast along guide rods 21 (control circuit open) or to a portion of its full travel, proportional to the degree of disturbance which is detected (feedback-closed control circuit).

Finally, an important point to note is that maintaining a stable longitudinal attitude of vehicle 1 by movable ballast 20 also has the advantage of minimizing noise and vibration of crawler traction devices 5.

What is claimed is:

1. A device for longitudinally balancing an agricultural vehicle, in particular a tractor, the device comprising:
    at least one ballast carried on one of a front end of the vehicle or a rear end of the vehicle and movable longitudinally along the agricultural vehicle;
    a first actuating device carried on the other of the front end of the vehicle or the rear end of the vehicle, the first actuating device configured to move a load on an implement connected to the vehicle upward or downward;
    a sensor for detecting stress of the load on the end of the vehicle affecting a longitudinal attitude of the agricultural vehicle; and
    a second actuating device connected to the ballast to move the ballast longitudinally in such a way as to at least partly compensate for the stress in response to a signal from the sensor, wherein the second actuating device moves the ballast to an extended position at least partially away from one end of the vehicle to offset the load from the other end of the vehicle, and wherein the second actuating device is positioned substantially within the ballast when in a non-extended position, and a portion of the second actuating device is disposed outside of the ballast when the ballast is in the extended position.

2. A device as claimed in claim 1, wherein the sensor emits signals of an intensity proportional to the stress.

3. A device as claimed in claim 1, wherein the first actuator device is a hydraulic actuator.

4. A device as claimed in claim 3, and comprising a central control unit connected to the sensor and a hydraulic feed circuit for feeding pressurized fluid to the hydraulic actuator, the circuit comprising a valve controlled by the central control unit.

5. A device as claimed in claim 4, wherein the hydraulic actuator and the hydraulic feed circuit communicate with each other via the valve.

6. A device as claimed in one of claim 1, wherein the sensor is configured to detect a pressure in a hydraulic feed circuit of the first actuating device for lifting the implement which is connected to and projecting from one end of the agricultural vehicle.

7. A device as claimed in claim 1, further comprising an inclinometer.

8. A device as claimed in claim 1, wherein the device further comprises a bracket connected integrally to one end of the agricultural vehicle and a guide fitted to the bracket and extending longitudinally with respect to the agricultural vehicle, the ballast being mounted on the guide to slide along the guide between a non-actuated position and an actuated position in which the ballast extends at least partially away from the end of the vehicle, the second actuating device being interposed between the ballast and the bracket, and the guide substantially contained within the ballast when the ballast is in the non-extended position, and the guide partially exposed when the ballast is in the extended position.

9. A device as claimed in claim 1, wherein the sensor is a pressure sensor.

10. An agricultural vehicle, in particular a tractor, having a longitudinal balancing device comprising:
   at least one ballast movable longitudinally along the agricultural vehicle, the ballast carried on one of a front end of the vehicle or a rear end of the vehicle;
   at least a first sensor and a second sensor for detecting stress affecting a longitudinal attitude of the agricultural vehicle;
   a first actuating device carried on the other of the front end of the vehicle or the rear end of the vehicle, the first actuating device configured to move a load on an implement connected to the vehicle upward or downward; and
   a second actuating device connected to the ballast to move the ballast longitudinally in such a way as to at least partly compensate for the stress in response to a signal from the first sensor or the second sensor, wherein the second actuating device moves the ballast to an extended position at least partially away from one end of the vehicle to offset the load from the other end of the vehicle, and wherein the second actuating device is positioned substantially within the ballast when in a non-extended position, and a portion of the second actuating device is disposed outside of the ballast when the ballast is in the extended position.

11. An agricultural vehicle as claimed in claim 10, wherein at least one of the first sensor and the second sensor emits signals of an intensity proportional to the stress.

12. A device as claimed in claim 11, wherein one of the first and second sensors comprises a pressure sensor.

13. A device as claimed in claim 11, wherein the other of the first and second sensors comprises an inclinometer.

14. A device as claimed in claim 10, wherein the first actuator device is a hydraulic actuator.

15. A device as claimed in claim 14, and comprising a central control unit connected to the sensor and a hydraulic feed circuit for feeding pressurized fluid to the hydraulic actuator, the circuit comprising a valve controlled by the central control unit.

16. A device as claimed in claim 15, wherein the hydraulic actuator and the hydraulic feed circuit communicate with each other via the valve.

17. A device as claimed in one of claim 10, wherein the sensor is configured to detect a pressure in a hydraulic feed circuit of the first actuating device for lifting the implement which is connected to and projecting from one end of the agricultural vehicle.

18. A device as claimed in claim 10, wherein the device further comprises a bracket connected integrally to one end of the agricultural vehicle and a guide fitted to the bracket and extending longitudinally with respect to the agricultural vehicle, the ballast being mounted on the guide to slide along the guide between a non-actuated position and an actuated position in which the ballast extends at least partially away from the end of the vehicle, the second actuating device being interposed between the ballast and the bracket, and the guide substantially contained within the ballast when the ballast is in the non-extended position, and the guide partially exposed when the ballast is in the extended position.

\* \* \* \* \*